(12) United States Patent
Moon

(10) Patent No.: US 7,449,837 B2
(45) Date of Patent: Nov. 11, 2008

(54) LAMP FOR A LIQUID CRYSTAL DISPLAY APPARATUS

(75) Inventor: Seung-Hwan Moon, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 551 days.

(21) Appl. No.: 10/542,597

(22) PCT Filed: Feb. 28, 2004

(86) PCT No.: PCT/KR2004/000440

§ 371 (c)(1),
(2), (4) Date: Jul. 13, 2005

(87) PCT Pub. No.: WO2004/081635

PCT Pub. Date: Sep. 23, 2004

(65) Prior Publication Data

US 2006/0181214 A1    Aug. 17, 2006

(30) Foreign Application Priority Data

Mar. 11, 2003    (KR) .................... 10-2003-0015131

(51) Int. Cl.
*H01J 11/00* (2006.01)
*G02F 1/1335* (2006.01)

(52) U.S. Cl. ........................................ 313/607; 349/70

(58) Field of Classification Search ................. 313/607; 349/69–71
See application file for complete search history.

(56) References Cited

U.S. PATENT DOCUMENTS

2002/0053722 A1 * 5/2002 Sakamoto et al. ........... 257/678
2002/0114141 A1    8/2002 Medina ..................... 361/728
2002/0114171 A1 * 8/2002 Yoo et al. ................... 362/561

FOREIGN PATENT DOCUMENTS

| JP | 11-040109   | 2/1999 |
| JP | 2002-151012 | 5/2002 |
| KR | 2000-0037279 | 7/2000 |
| KR | 2001-0074027 | 8/2001 |

* cited by examiner

*Primary Examiner*—Toan Ton
*Assistant Examiner*—Britt Hanley
(74) *Attorney, Agent, or Firm*—F. Chau & Associates, LLC

(57) ABSTRACT

In a lamp that prevents outflow of mercury filled in a lamp tube and a liquid crystal display apparatus having the lamp, the lamp includes a lamp tube and an electrode. The lamp tube is filled with a discharge gas and a fluorescent material. The electrode is disposed on both ends of the lamp tube. An insulating adhesive material is interposed between the lamp tube and an insertion hole into which the lamp tube is inserted. The lamp tube is combined with the electrode by the insulating adhesive material. A pin hole that may be generated in the lamp tube corresponding to the insertion hole of the electrode is sealed. Thus, outflow of the mercury in the lamp tube may be prevented.

7 Claims, 6 Drawing Sheets

LAMP FOR A LIQUID CRYSTAL DISPLAY APPARATUS

TECHNICAL FIELD

The present invention relates to a lamp and a liquid crystal display apparatus having the lamp. More particularly, the present invention relates to a lamp with an increased lifetime and reduced environmental problems, and a liquid crystal display apparatus having the lamp.

BACKGROUND ART

A direct-illumination type liquid crystal display apparatus, in general, includes a liquid crystal display panel that displays an image and a plurality of lamps that supplies a light to the liquid crystal display panel.

In the direct-illumination type liquid crystal display apparatus, a plurality of lamps is disposed under a liquid crystal display panel substantially in parallel with each other to provide the liquid crystal display panel with a light directly. In an edge-illumination type liquid crystal display apparatus, a lamp is disposed at an edge of a light guide plate that is disposed under the liquid crystal display panel, so that the lamp provides the liquid crystal display panel with a light via the light guide plate. That is, in the edge-illumination type liquid crystal display apparatus, the lamp provides the liquid crystal display panel with a light indirectly. Thus, the direct-illumination type liquid crystal display apparatus has a wider light emission surface and higher brightness than those of the edge-illumination type liquid crystal display apparatus.

Since the direct-illumination type liquid crystal display apparatus includes a plurality of lamps, the direct-illumination type liquid crystal display apparatus uses an external electrode in a lamp, which is economical and easy to operate in parallel.

The external electrode has an insertion hole through which one end portion of a lamp tube of the lamp is inserted, and first and second external electrodes are formed at first and second ends of the lamp tube, respectively. An electric power from an external power supply is provided to the external electrode, and then the lamp tube generates a light in response to the electric power provided to the external electrode.

When the lamp tube generates the light, electric current flows from the first external electrode to the second external electrode along the lamp tube that comprises glass, or vice versa in accordance with voltages applied. When the current density is greater than a proper current density, heat is generated in the lamp tube to melt the glass of the lamp tube, thereby causing a pin hole in the lamp tube.

When the pin hole is generated in the lamp tube adjacent to the insertion hole, a heavy metal such as mercury in the lamp tube flows out. Thus, the lifetime of the lamp having the lamp tube decreases. Moreover, the mercury outflow causes environmental problems.

DISCLOSURE OF INVENTION

Technical Problem

The present invention provides a lamp that prevents outflow of a heavy metal in a lamp tube of the lamp.

The present invention also provides a liquid crystal display apparatus having the lamp.

Technical Solution

The lamp in accordance with one exemplary embodiment of the present invention includes a lamp tube, a first electrode, a second electrode and an insulating adhesive material. The lamp tube generates a light in response to an electric power provided from an external power supply. The first electrode is disposed on a first end portion of the lamp tube, and the first electrode corresponds to an external electrode having an insertion hole through which the first end portion of the lamp tube is received. The second electrode is disposed on a second end portion of the lamp tube. The insulating adhesive material is disposed between the lamp tube and an end portion of the first electrode near the insertion hole. The insulating adhesive material functions to combine the lamp tube with the first electrode.

The liquid crystal display apparatus in accordance with one exemplary embodiment of the present invention includes a lamp and a liquid crystal display panel. The lamp includes a lamp tube, a first electrode, a second electrode and an insulating adhesive material. The lamp tube generates a light in response to an electric power provided from an external power supply. The first electrode is disposed on a first end portion of the lamp tube, and the first electrode corresponds to an external electrode having an insertion hole through which the first end portion of the lamp tube is inserted. The second electrode is disposed on a second end portion of the lamp tube. The insulating adhesive material is disposed between the lamp tube and an end portion of the first electrode near the insertion hole. The insulating adhesive material combines the lamp tube with the first electrode. The liquid crystal display panel is disposed over the lamp, and the liquid crystal display panel displays an image using the light from the lamp.

The lamp and the liquid crystal display apparatus prevent generation of a pin hole in the lamp tube corresponding to the insertion hole of the first electrode. The lamp and the liquid crystal display apparatus also reduce environmental problems.

DESCRIPTION OF DRAWINGS

The above and other advantages of the present invention will become readily apparent by reference to the following detailed description when considered in conjunction with the accompanying drawings wherein.

BEST MODE

Figure 1:
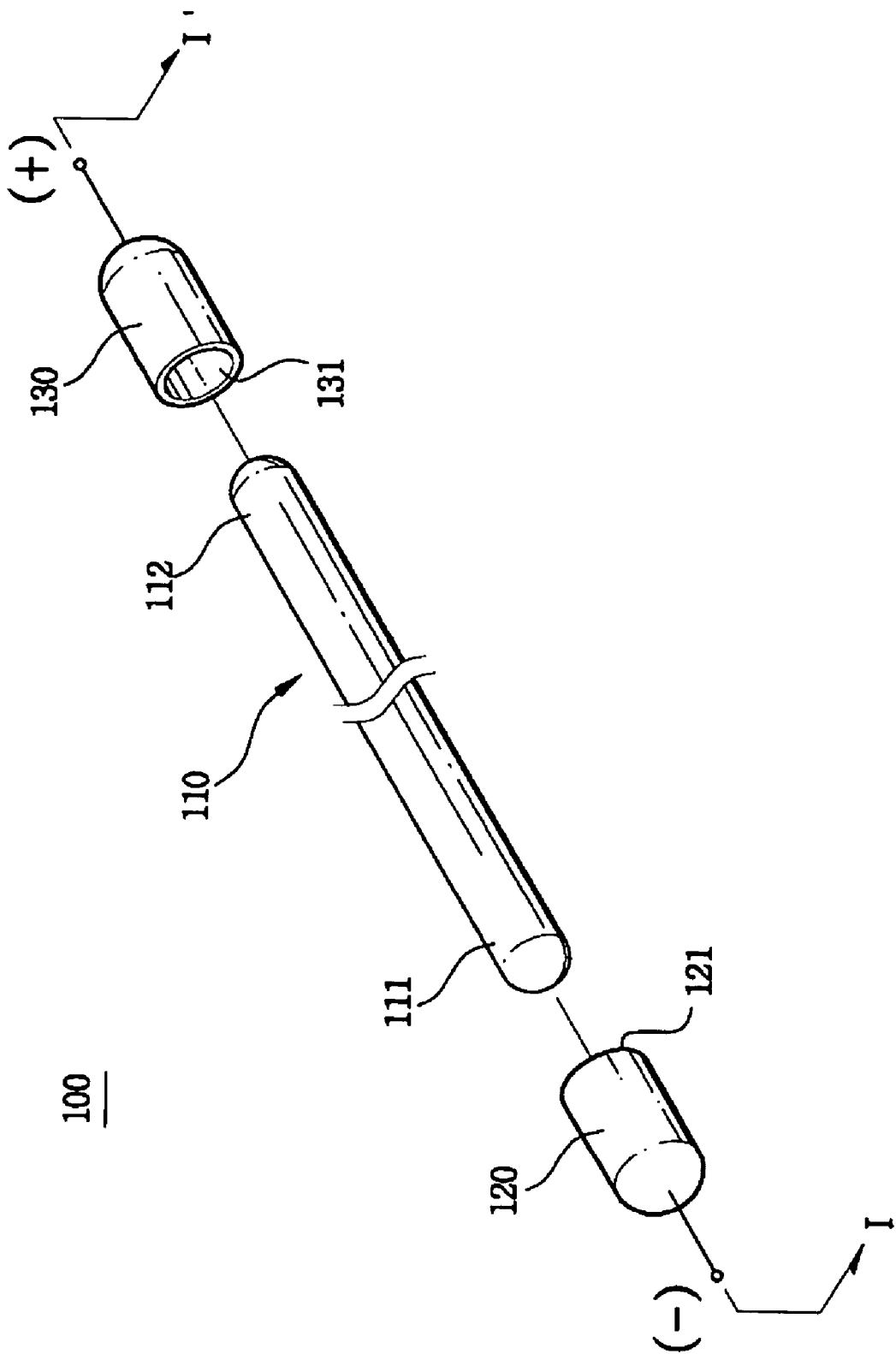
FIG. 1 is an exploded perspective view illustrating a lamp according to an exemplary embodiment of the present invention.

FIG. 1 is an exploded perspective view illustrating a lamp according to an exemplary embodiment of the present invention.

Referring to FIG. 1, the lamp 100 includes a lamp tube 110, a first electrode 120 and a second electrode 130. An electric power is provided to the first and second electrodes 120 and 130 from an external power supply (not shown). The lamp tube 110 generates a light in response to the electric power.

The lamp tube 110 has closed two ends, and comprises glass. The lamp tube 110 is filled with a fluorescent material and a discharge gas.

The first electrode 120 is disposed on a first end portion 111 of the lamp tube 110, and the second electrode 130 is disposed on a second end portion 112 of the lamp tube 110. The first end portion 111 is disposed opposite to the second end portion 112.

Each of the first and second electrodes 120 and 130 has a cylindrical shape with one end opened and the other end closed. Each of the closed ends of the first and second electrodes 120 and 130 is connected to the external power supply. The electric power is, then, provided to the first and the second electrodes 120 and 130 to generate the light in the lamp tube 110.

In particular, the first electrode 120 has a first insertion hole 121 at the opened end. The first end portion 111 of the lamp tube 110 is inserted into the first insertion hole 121. The closed end of the first electrode 120 is connected to the power supply that provides the electric power to the first electrode 120.

The second electrode 130 has a second insertion hole 131 at the opened end. The second end portion 112 of the lamp tube 110 is inserted into the second insertion hole 131. The closed end of the second electrode 130 is connected to the power supply that provides the electric power to the second electrode 130.

The first end portion 111 of the lamp tube 110 is inserted into the first electrode 120 through the first insertion hole 121. The second end portion 112 of the lamp tube 110 is inserted into the second electrode 130 through the second insertion hole 131.

When the lamp 100 is operated by electricity, an electric power is provided from the power supply to the first and second electrodes 120 and 130.

The lamp tube 110 generates a light in response to the electric power provided to the first and second electrodes 120 and 130.

In FIG. 1, the first and second electrodes 120 and 130 of the lamp 100 correspond to external electrodes that are disposed on an outer face of the lamp tube 110. Alternatively, one of the first and second electrodes 120 and 130 ray be formed in the lamp tube 110.

Figure 2:
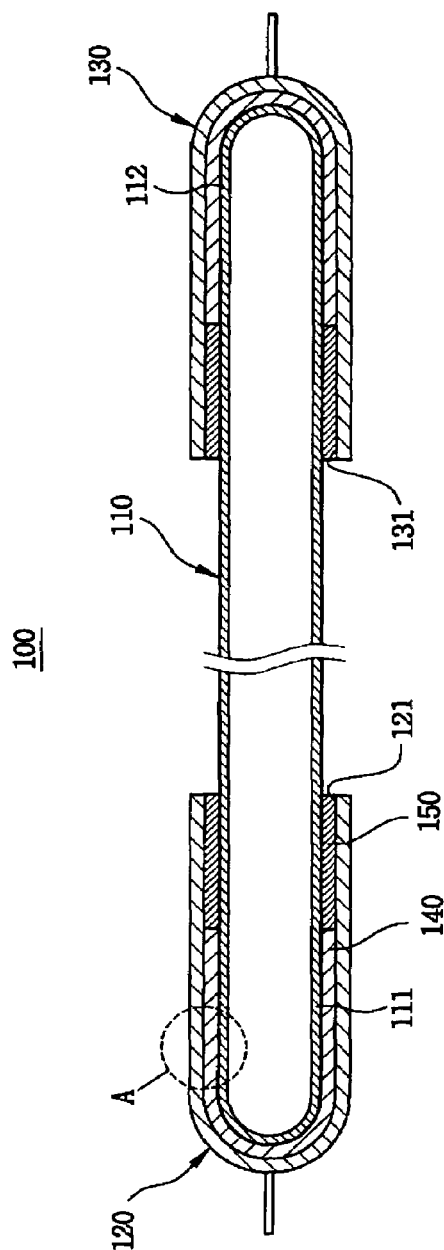
FIG. 2 is a cross-sectional view taken along a line I-I' of FIG. 1.
Figure 3:
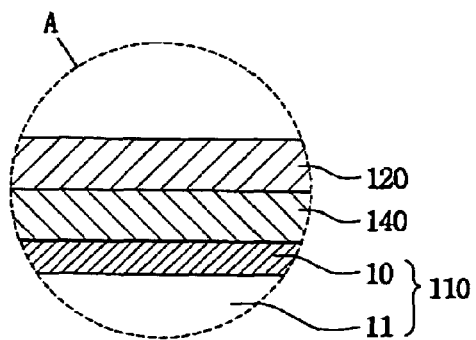
FIG. 3 is an enlarged view illustrating 'A' of FIG. 2.

FIG. 2 is a cross-sectional view taken along a line I-I' of FIG. 1. FIG. 3 is an enlarged view illustrating 'A' of FIG. 2.

Referring to FIGS. 2 and 3, the first end portion 111 is inserted into the first electrode 120, and the second end portion 112 is inserted into the second electrode 130.

A conductive adhesive material 140 may be interposed between the first end portion 111 and the first electrode 120. The conductive adhesive material 140 may also be interposed between the second end portion 112 and the second electrode 130. The conductive adhesive material 140 prevents detachment of the first and second end portions 111 and 112 from the first and second electrodes 120 and 130, respectively.

The conductive adhesive material 140 comprises silver. For example, the conductive adhesive material 140 includes silver particles with small diameters. The conductive adhesive material 140 further comprises a resin and a volatile solvent. The resin maintains the shape of the silver particles, and the volatile solvent cures the resin.

The conductive adhesive material 140 is coated on the first end portion 111 and/or on the second end portion 112 of the lamp tube 10. Alternatively, the conductive adhesive material 140 may be coated on the inner face of the first electrode 120 and/or the second electrode 130. The first end portion 111 may be combined with the first electrode 120 by the conductive adhesive material 140. The second end portion 112 may also be combined with the second electrode 130 by the conductive adhesive material 140. Because the conductive adhesive material 140 includes silver that is a conductive material, the first end portion 111 is electrically connected to the first electrode 120. The second end portion 112 may also be electrically connected to the second electrode 130 by the conductive adhesive material 140.

Referring to FIG. 3, the electric power is provided to the first electrode 120 from the external power supply. The first electrode 120 is connected to the lamp tube 110 by the conductive adhesive material 140. The lamp tube 110 generates a light in response to the electric power provided to the first electrode 120.

In other words, the lamp tube 110 is combined with the first electrodes 120 and/or the second electrodes 130 by the conductive adhesive material 140. In addition, the lamp tube 110 is connected to the first electrodes 120 and/or the second electrodes 130 by the conductive adhesive material 140.

When the electric power is supplied to the lamp tube 110, the electric current in the lamp tube 110 flows from the first electrode 120 to the second electrode 130.

When the current density of the electric current is higher than a preferred density, heat is generated in the portion of the first and second end portions 111 and 112 that is in contact with the electric current.

The lamp tube 110 includes glass 10 and a discharge space 11. Because the lamp tube 110 includes the glass 10, a pin hole nay be generated in the glass 10 by the heat near the first end portion 111 and/or the second end portion 112.

When the pin hole is generated in the first electrode 120 and/or the second electrode 130, the pin hole is sealed with the conductive adhesive material 140. That is to say, the first end portion 111 is combined with the first electrode 120 by the conductive adhesive material 140, and the second end portion 112 is combined with the second electrode 130 by the conductive adhesive material 140. Because the conductive adhesive material 140 seals the pin hole, outflow of mercury in the lamp tube 110 may be prevented.

When the pin hole is generated in the lamp tube 110 adjacent to the first insertion hole 121 and/or the second insertion hole 131, the pin hole may not be sealed with the conductive adhesive material 140. Thus, the mercury in the lamp tube 110 may flow out.

To seal the pin hole near the first insertion hole 121 and/or the second insertion hole 131, an insulating adhesive material 150 is interposed between the lamp tube 110 and an end portion of the first electrode 120 near the first insertion hole 121. The insulating adhesive material 150 may also be interposed between the lamp tube 110 and an end portion of the second electrode 130 near the second insertion hole 131.

The first electrode 120 and/or the second electrode 130 are combined with the lamp tube 110 by the insulating adhesive material 150. In addition, the first electrode 120 and/or the second electrode 130 are electrically insulated from the lamp tube 110 by the insulating adhesive material 150, for example, such as silicon, etc.

Hereinafter, the combination of the first electrode 120, the insulating adhesive material 150 and the lamp tube 110 will be described in detail with reference to FIG. 4.

Figure 4:
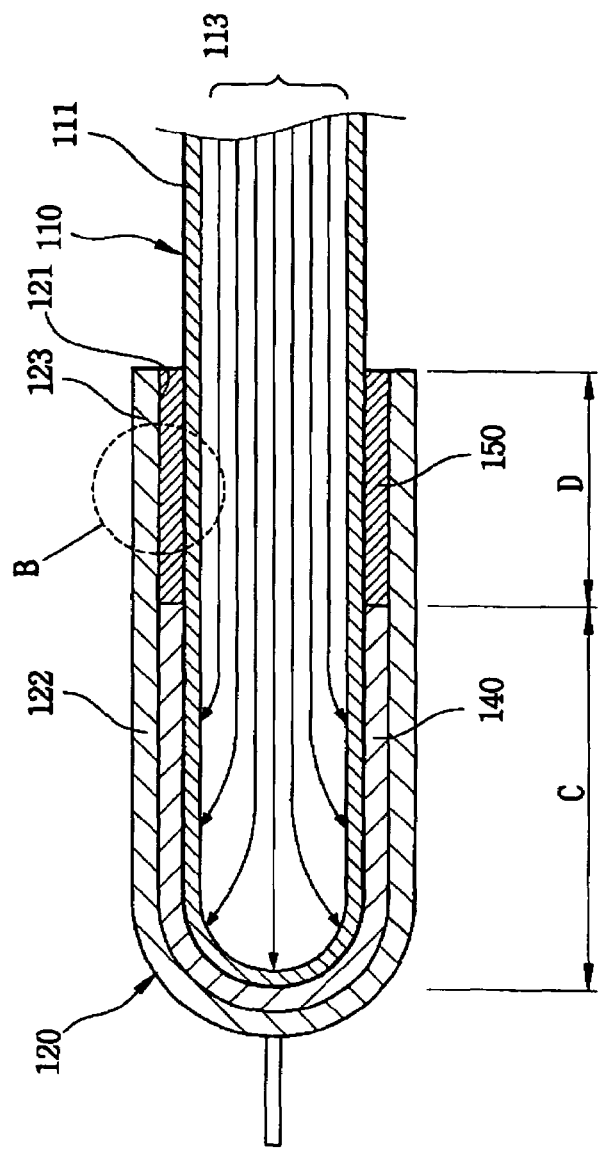
FIG. 4 is a cross-sectional view illustrating combination of the lamp tube and the first electrode of FIG. 2.
Figure 5:
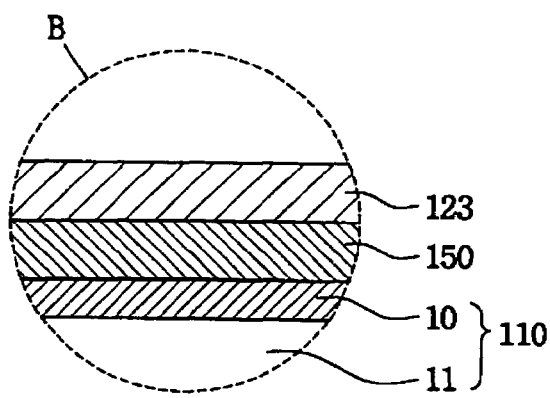
FIG. 5 is an enlarged view illustrating 'B' of FIG. 4.

FIG. 4 is a cross-sectional view illustrating combination of the lamp tube and the first electrode of FIG. 2. FIG. 5 is an enlarged view illustrating 'B' of FIG. 4. The combination of the second electrode 130, the insulating adhesive material 150 and the lamp tube 110 is substantially identical to that of the first electrode 120, and is therefore will be omitted.

Referring to FIGS. 4 and 5, the first electrode 120 has a capping portion 122 and an insulating portion 123. The capping portion 122 covers the first end portion 111 of the lamp tube 110. The capping portion 122 is connected to the lamp tube 110. The capping portion 122 is also electrically connected to the power supply, and an electric power is provided to the first electrode 120. The insulating portion 123 having the first insertion hole 121 is extended from the capping portion 122.

In particular, the capping portion 122 is combined with the first end portion 111 of the lamp tube 110 by the conductive adhesive material 140 interposed between the capping portion 122 and the first end portion 111. The capping portion 122 is connected to the first end portion 111 by the conductive adhesive material 140.

As shown in FIG. 5, the insulating portion 123 is combined with the first end portion 111 of the lamp tube 110 by the insulating adhesive material 150 interposed between the insulating portion 123 and the first end portion 111. The insulating portion 123 is electrically insulated from the first end portion 111 by the insulating adhesive material 150.

Thus, the portion of the first end portion 111 corresponding to the capping portion 122 is electrically connected to the capping portion 122, and the portion of the first end portion 111 corresponding to the insulating portion 123 is electrically insulated from the insulating portion 123.

In other words, the first end portion 111 is combined with the first electrode 120 by the conductive adhesive material 140 so as to be electrically connected to the first electrode 120. The first end portion 111 is combined with the first electrode 120 by the insulating adhesive material 150 so as to be electrically insulated from the first electrode 120.

When the lamp 100 is operated by electricity, an electric current 113 flows to a conductive region C corresponding to the capping portion 122, whereas the electric current 113 does not flow to an insulating region D corresponding to the insulating portion 123.

The lamp tube 110 includes glass 10 and a discharge space 11. Because the lamp tube 110 includes the glass 10, a pin hole may be generated in the glass 10 in the conductive region C. In the insulating region D, however, the pin hole may not be generated.

When the pin hole is generated in the conductive region C adjacent to the insulating region D, the insulating adhesive material 150 seals the pin hole. Accordingly, outflow of the mercury from the lamp tube 110 may be prevented, thereby reducing environmental pollution.

Figure 6:
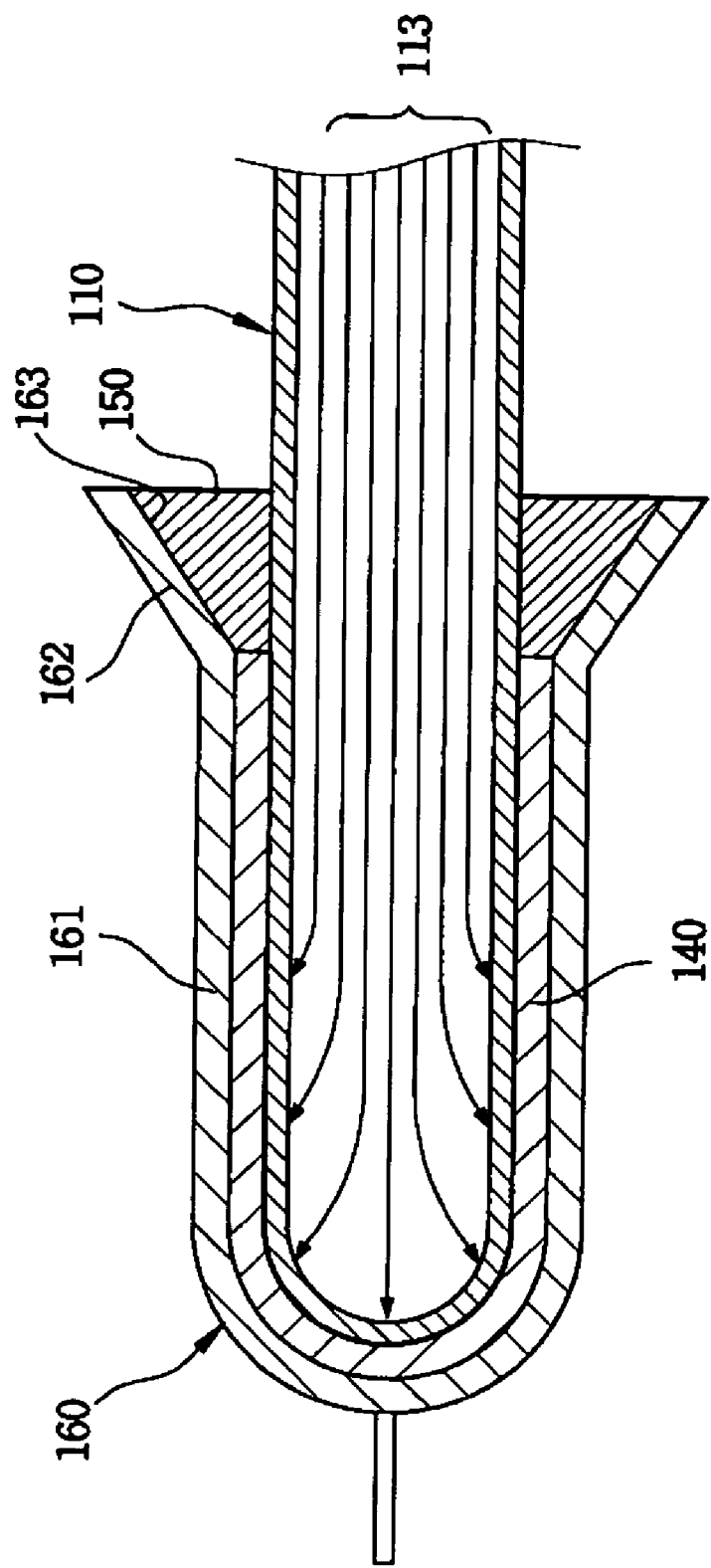
FIG. 6 is a cross-sectional view illustrating an electrode according to an exemplary embodiment of the present invention.
Figure 7:
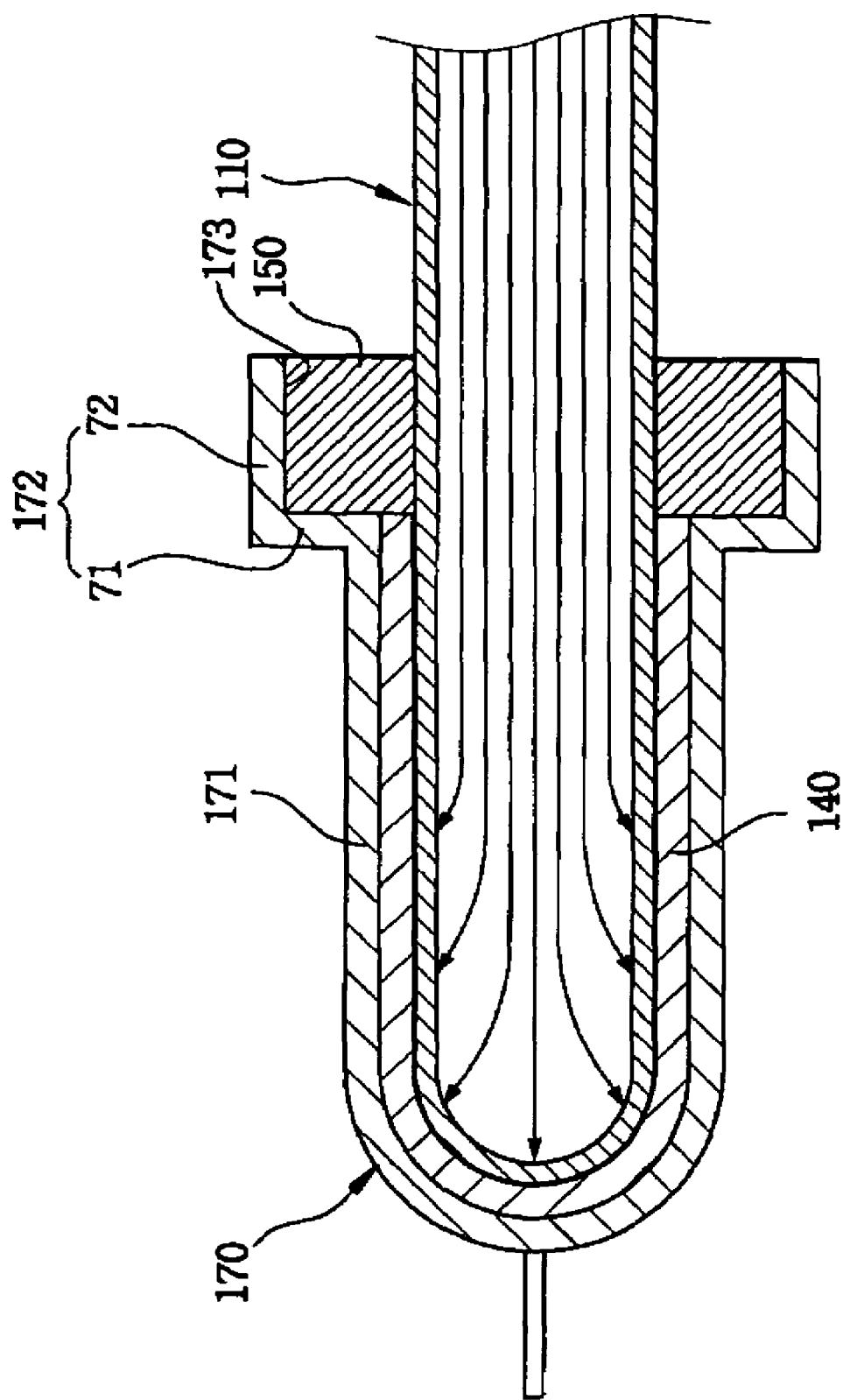
FIG. 7 is a cross-sectional view illustrating an electrode according to anther exemplary embodiment of the invention.

FIG. 6 is a cross-sectional view illustrating an electrode according to an exemplary embodiment of the present invention. FIG. 7 is a cross-sectional view illustrating an electrode according to anther exemplary embodiment of the present invention.

Referring to FIGS. 6 and 7, the insulating region of electrodes 160 and 170 having an insulating adhesive material 150 coated thereon may have various shapes.

Referring to FIG. 6, the electrode 160 according to an exemplary embodiment of the present invention includes a capping portion 161 and an insulating portion 162. The capping portion 161 connected to the lamp tube 110 covers an end portion of the lamp tube 110. The capping portion 161 is electrically connected to a power supply to provide an electric power to the electrode 160. The insulating portion 162 extended from the capping portion 161 has an insertion hole 163 into which the end portion of the lamp tube 110 is inserted.

In particular, the capping portion 161 is electrically connected to the power supply. The capping portion 161 is combined with the lamp tube 110 by a conductive adhesive material 140 interposed therebetween, so as to be electrically connected to the capping portion 161.

The insulating portion 162 is extended from the capping portion 161. A distance between the insulating portion 162 and the lamp tube 110 increases as the insulating portion 162 is extended from the capping portion 161 to the insertion hole 163. The insulating adhesive material 150 is interposed between the insulating portion 162 and the lamp tube 110, thereby combining the insulating portion 162 with the lamp tube 110. As a result, the capping portion 161 is electrically insulated from the lamp tube 110 by the insulating adhesive material 150.

Referring to FIG. 7, the electrode 170 according to another exemplary embodiment of the present invention includes a capping portion 171 and an insulating portion 172. The capping portion 171 connected to the lamp tube 110 covers an end portion of the lamp tube 110. The capping portion 171 is electrically connected to a power supply to provide an electric power to the electrode 170. The insulating portion 172 extended from the capping portion 171 has an insertion hole 173 into which the end portion of the lamp tube 110 is inserted.

In particular, the capping portion 171 electrically connected to the power supply is combined with the lamp tube 110 by a conductive adhesive material 140 interposed therebetween. Consequently, the lamp tube 110 is electrically connected to the capping portion 171 by the conductive adhesive material 140.

The insulating portion 172 has an insulating supporting portion 71 and an insulating guiding portion 72. The insulating supporting portion 71 is extended from the capping portion 171 in a direction substantially perpendicular to a longitudinal direction of the lamp tube 110. The insulating guiding portion 72 is extended from the insulating supporting portion 71 in the longitudinal direction of the lamp tube 110.

The insulating guiding portion 72 is spaced apart from the lamp tube 110 by a specific distance. The distance that the insulating guiding portion 72 is spaced apart from the lamp tube 110 is substantially identical to the distance that the insulating supporting portion 72 is extended from the capping portion 171 in the direction substantially perpendicular to the longitudinal direction of the lamp tube 110.

An insulating adhesive material 150 is interposed between the insulating portion 172 and the lamp tube 110 to combine the insulating portion 172 with the lamp tube 110. As a result, the insulating portion 172 is electrically insulated from the lamp tube 110 by the insulating adhesive material 150.

Figure 8:
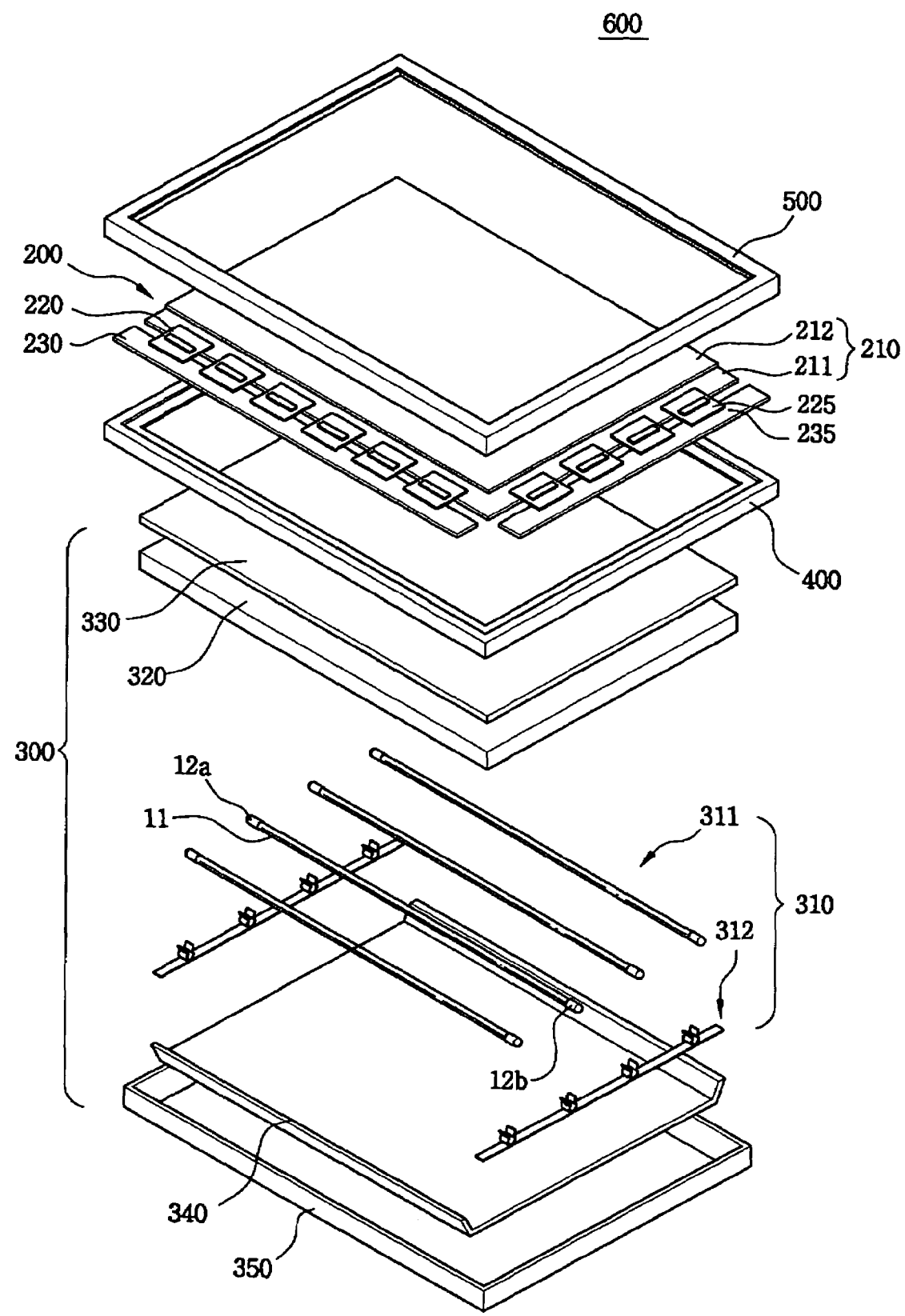
FIG. 8 is an exploded perspective view illustrating a direct-illumination type liquid crystal display apparatus according to an exemplary embodiment of the present invention.

FIG. 8 is an exploded perspective view illustrating a direct-illumination type liquid crystal display apparatus according to an exemplary embodiment of the present invention.

Referring to FIG. 8, the liquid crystal display apparatus 600 includes a display unit 200, a backlight assembly 300, a mold frame 400 and a top chassis 500. The display unit 200 displays an image with a light supplied thereto from the backlight assembly 300. The mold frame 400 and the top chassis 500 receive the display unit 200.

The display unit 200 includes a liquid crystal display panel 210, a data tape carrier package 220, a gate tape carrier package 225, a data printed circuit board 230 and a gate printed circuit board 235.

In particular, the liquid crystal display panel 210 includes a thin film transistor substrate 211, a color filter substrate 212 corresponding to the thin film transistor substrate 211 and a liquid crystal layer (not shown) interposed between the thin film transistor substrate 211 and the color filter substrate 212.

The thin film transistor substrate 211 has a thin film transistor (not shown) operating as a switching device formed thereon. The thin film transistor is arranged in a matrix shape, and applies a signal voltage to the liquid crystal layer.

The color filter substrate 212 corresponding to the thin film transistor substrate 211 has red, green and blue pixels that are formed by a thin film forming process. The red, green and blue pixels display colors by a light.

The data tape carrier package 220 is attached to the source portion of the thin film transistor substrate 211, and the gate tape carrier package 225 is attached to the gate portion of the thin film transistor substrate 211. The data tape carrier package 220 determines the timing for applying a data operation signal. The gate tape carrier package 225 determines the timing for applying a gate operation signal.

One end of the data tape carrier package 220 is attached to the thin film transistor substrate 211, and the other end of the data tape carrier package 220 is attached to the data printed circuit board 230. The liquid crystal display panel 210 is, therefore, electrically connected to the data printed circuit board 230.

One end of the gate tape carrier package 225 is attached to the thin film transistor substrate 211, and the other end of the gate tape carrier package 225 is attached to the gate printed circuit board 235. The liquid crystal display panel 210 is, as a result, electrically connected to the gate printed circuit board 235.

An electrical signal is applied to the data printed circuit board 230 and then applied to the data tape carrier package 220. An electrical signal is applied to the gate printed circuit board 235, and then it is applied to the gate tape carrier package 225.

The data tape carrier package 220 and the gate tape carrier package 225 apply an operation signal that determines the timing for operating the liquid crystal display panel 210, and a timing signal that determine that timing for controlling the operation time to the liquid crystal display panel 210.

The backlight assembly 300 disposed under the display unit 200 includes a lamp unit 310, a diffusion plate 320, a diffusion sheet 330, a reflection plate 340 and a bottom chassis 350. The lamp unit 310 generates a first light that displays an image. The diffusion plate 320 and the diffusion sheet 330 convert the first light into a second light that has uniform brightness. The reflection plate 340 reflects the light leaked form the lamp unit 310 toward the diffusion plate 320. The bottom chassis 350 receives the reflection plate 340 and the lamp unit 310.

The lamp unit 310 includes a plurality of lamps 311 and a lamp socket 312. The lamps 311 generate a light, and the lamp socket 312 fixes the lamps 311.

The lamp 311 includes a lamp tube 11, a first electrode 12a and a second electrode 12b. The lamp tube 11 is filled with a discharge gas, and internal surface of the lamp tube 11 is coated by a fluorescent material. The first and second electrodes 12a and 12b are disposed on both ends of the lamp tube 11, respectively and are combined with the lamp socket 312. An electric power from an external power supply source is provided to the first and second electrodes 12a and 12b through the lamp socket 312.

Each of the first and second electrodes 12a and 12b has an insertion hole (not shown) into which each end of the lamp tube 11 is inserted. A conductive adhesive material (not shown) is interposed between the first electrode 12a and the lamp tube 11 as well as between the second electrode 12b and the lamp tube 11. The first and second electrodes 12a and 12b are connected to the lamp tube 11.

The conductive adhesive material seals a pin hole that is generated in the lamp tube 11, thereby preventing outflow of the mercury filled in the lamp tube 11. Moreover, the lamp tube 11 is connected to the first and second electrodes 12a and 12b by the conductive adhesive material.

An insulating adhesive material (not shown) is interposed between the insertion hole and the lamp tube 11 so as to combine the first electrode 12a with the lamp tube 11, and to combine the second electrode 12b with the lamp tube 11.

The insulating adhesive material seals a pin hole that is generated in the lamp tube 11, thereby preventing outflow of the mercury filled in the lamp tube 11. Moreover, the lamp tube 11 is electrically insulated from the first electrode 12a and the second electrode 12b by the insulating adhesive material.

When the lamp 311 is operated with electricity, the electric power conducted to the lamp socket 312 is provided to the first and second electrodes 12a and 12b. The lamp tube 11 generates a light in response to the electric power by the conductive adhesive material.

The insertion holes of the first and second electrodes 12a and 12b are insulated from the lamp tube 11 by the insulating adhesive material.

The lamp socket 312 includes a conductive material. The lamp socket 312 has a clip portion that fixes the lamp 311. The lamp socket 312 is disposed according to the direction of which the lamp 311 is disposed.

The lamp unit 310 generates a first light that displays an image, and then it provides the first light to the diffusion plate 320 and the diffusion sheet 330.

The diffusion plate 320 and the diffusion sheet 330 are disposed over the lamp unit. The diffusion plate 320 and the diffusion sheet 330 exit the second light to the liquid crystal display panel 210.

The reflection plate 340 is deposed under the lamp unit 310. The reflection plate 340 reflects the light that is leaked from the lamp unit 310 to the diffusion plate 320.

The bottom chassis 350 is disposed under the reflection plate 340. The bottom chassis 350 has a space to contain the reflection plate 340 and the lamp unit 310. The diffusion plate 320 and the diffusion sheet 330 are mounted on a stepper portion of a sidewall of the bottom chassis 270.

The mold frame 400 is mounted over the diffusion sheet 330. The mold frame 400 receives the liquid crystal display panel 210. The mold frame 400 is combined with the bottom chassis 350.

The top chassis 500 is disposed over the liquid crystal display panel 210. The top chassis 500 covers the liquid crystal display panel 210 except an effective display region. The top chassis 500 is combined with the bottom chassis 350 to fix the liquid crystal display panel 210 in the mold frame 400.

INDUSTRIAL APPLICABILITY

As mentioned above, an insulating adhesive material is interposed between a lamp tube and an insertion hole into which the lamp tube is inserted. A pin hole generated in the lamp tube corresponding to the insertion hole is sealed by the insulating adhesive material, so that outflow of mercury filled in the lamp tube may be prevented. Moreover, environmental problem due to the outflow of a heavy metal such as mercury may be prevented.

Although the exemplary embodiments of the present invention have been described, it is understood that the present invention should not be limited to these exemplary embodiments but various changes and modifications can be made by one ordinary skilled in the art within the scope of the present invention as hereinafter claimed.

The invention claimed is:

1. A lamp comprising:
a lamp tube that generates a light in response to an electric power provided from an external power supply;
a first electrode disposed on a first end portion of the lamp tube, the first electrode corresponding to an external electrode having an insertion hole into which the first end portion of the lamp tube is received;
a second electrode disposed on a second end portion of the lamp tube; and
an insulating adhesive material that combines the lamp tube with the first electrode, the insulating adhesive material being disposed between the lamp tube and an end portion of the first electrode near the insertion hole,
wherein the first electrode comprises:
a capping portion that covers the first end portion of the lamp tube, the capping portion being connected to the lamp tube; and
an insulating portion that has the insertion hole and is extended from the capping portion, the insulating adhesive material being coated on the insulating portion to combine the lamp tube with the insulating portion; and
wherein an electrically conductive adhesive material is interposed between the capping portion and the lamp tube, the capping portion being combined with the lamp tube by the electrically conductive adhesive material.

2. The lamp of claim 1, wherein the electricity conductive adhesive material comprises silver.

3. A lamp comprising:
a lamp tube that generates a light in response to an electric power provided from an external power supply;
a first electrode disposed on a first end portion of the lamp tube, the first electrode corresponding to an external electrode having an insertion hole into which the first end portion of the lamp tube is received;
a second electrode disposed on a second end portion of the lamp tube and
an insulating adhesive material that combines the lamp tube with the first electrode, the insulating adhesive material being disposed between the lamp tube and an end portion of the first electrode near the insertion hole,
wherein the first electrode comprises:
a capping portion that covers the first end portion of the lamp tube, the capping portion being connected to the lamp tube; and
an insulating portion that has the insertion hole and is extended from the capping portion, the insulating adhesive material being coated on the insulating portion to combine the lamp tube with the insulating portion, and
wherein a distance between the insulating portion and the lamp tube increases as the insulating portion is extended from the capping portion.

4. A lamp comprising:
a lamp tube that generates a light in response to an electric power provided from an external power supply;
a first electrode disposed on a first end portion of the lamp tube, the first electrode corresponding to an external electrode having an insertion hole into which the first end portion of the lamp tube is received;
a second electrode disposed on a second end portion of the lamp tube; and
an insulating adhesive material that combines the lamp tube with the first electrode, the insulating adhesive material being disposed between the lamp tube and an end portion of the first electrode near the insertion hole,
wherein the first electrode comprises:
a capping portion that covers the first end portion of the lamp tube, the capping portion being connected to the lamp tube; and
an insulating portion that has the insertion hole and is extended from the capping portion, the insulating adhesive material being coated on the insulating porion to combine the lamp tube with the insulating portion, and
wherein the insulating portion comprises:
an insulating supporting portion that is extended from the capping potion in a direction substantially perpendicular to a longitudinal direction of the lamp tube; and
an insulating guiding portion that is extended from the insulating supporting portion in the longitudinal direction of the lamp tube, the insulating adhesive material being coated on the insulating guiding portion to combine the lamp tube with the insulating guiding portion.

5. The lamp of claim 4, wherein the insulating guiding portion is spaced apart from the lamp tube by a distance substantially identical to the distance that the insulating supporting portion is extended from the capping portion in the direction substantially perpendicular to the longitudinal direction of the lamp tube.

6. The lamp of claim 1, wherein the insulating adhesive material comprises silicon.

7. A liquid crystal display apparatus comprising:
a lamp including a lamp tube that generates a light in response to an electric power provided from an external power supply; a first electrode disposed on a first end portion of the lamp tube, the first electrode corresponding to an external electrode having an insertion hole into which the first end portion of the lamp tube is received; a second electrode disposed on a second end portion of the lamp tube; and an insulating adhesive material that combines the lamp tube with the first electrode, the insulating adhesive material being disposed between the lamp tube and an end portion of the first electrode near the insertion hole; and
a liquid crystal display panel disposed over the lamp, the liquid crystal display panel displaying an image using the light from the lamp,
wherein the first electrode comprises:
a capping portion that covers the first end portion of the lamp tube, the capping portion being connected to the lamp tube; and
an insulating portion that has the insertion hole and is extended from tube capping portion, the insulating adhesive material being coated on the insulating portion to combine the lamp tube with the insulating portion, and
wherein an electrically conductive adhesive material is interposed between the capping portion and the lamp tube, the capping portion being combined with the lamp tube by the electrically conductive adhesive material.

* * * * *